United States Patent [19]
Beyer

[11] Patent Number: 4,850,116
[45] Date of Patent: Jul. 25, 1989

[54] ELECTRONIC TATTLE TALE

[75] Inventor: John D. Beyer, Escondido, Calif.

[73] Assignee: Rohr Industries, Inc., Chula Vista, Calif.

[21] Appl. No.: 187,963

[22] Filed: Apr. 29, 1988

[51] Int. Cl.⁴ .............................................. G01B 5/00
[52] U.S. Cl. ...................................................... 33/788
[58] Field of Search ............. 33/125 R, 125 B, 143 R,
    33/143 L, 147 D, 147 N, 148 D, DIG. 19, 172
    E; 200/11 DA, 292; 377/24; 73/799, 313

[56] References Cited

U.S. PATENT DOCUMENTS

| | | | |
|---|---|---|---|
| 1,759,219 | 5/1930 | Bowlus | 33/147 D X |
| 4,237,612 | 12/1980 | Christian | 33/143 L |
| 4,486,891 | 12/1984 | Kimoto et al. | 377/24 |
| 4,652,704 | 3/1987 | Franklin | 200/292 X |

FOREIGN PATENT DOCUMENTS 2274021  1/1976  France ............................. 33/143 R Primary Examiner—Harry N. Haroian
Attorney, Agent, or Firm—Patrick J. Schlesinger; Frank D. Gilliam

[57] ABSTRACT

An electronic indicator comprising a first portion attached at one end to an object to be controllably stretched or elongated and a second portion slideably connected to the first portion for relative movement therewith and connected at one end remote from the object attachment of the first portion. Electrical connections donating relative movement between the two indicator portions are attached to monitoring equipment to indicate stretch length.

5 Claims, 1 Drawing Sheet

ELECTRONIC TATTLE TALE

BACKGROUND OF THE INVENTION

The invention is directed to stretch forming material, and particularly to controlled stretch forming of material such as ductile materials used in modern aircraft to form ducts, external skins, and the like.

Mechanical tattle tales have been used for stretch forming for a great number of years and define the present state of the art as known today.

Widely known state of the art tattle tales, an example of which is shown in FIG. 1 and identified as prior art, consists of a generally rectangular shaped piece of foil or thin material B having a longitudinal axis of greater length than width. Equally spaced apart graduations C are inscribed or printed on the upper portion of the rectangular foil or material to indicate specific distances therealong. A pair of vertical cuts D are located on each longitudinal end of the rectangular portion. An elongated tattle tale recorder strip E is inserted within the vertical cuts D as shown so as to allow relative movement between the rectangular and elongated portions. When the elongated strip E is inserted through the cuts, an arrow indicator F pointing in the direction of the graduations is located so that the arrow direction indicates the end graduations adjacent to the rectangular shaped foil's attachment point to the material. The end H of the elongated strip, remote from the rectangular attachment point, is attached to the material to be stretched and the material is then stretched until the arrow on the elongated portion aligns with the desired graduation on the rectangular portion. In a typical application, the arrow is moved slightly further than required to allow for any spring back elasticity in the material to insure the exact stretch length desired.

Generally the material to be stretch formed is located remote from the stretch forming machine and the machine operator. This requires that at least a second worker trained in the stretch forming art be present to watch the tattle tale and signal the machine operator to terminate the machine stretch operation when the desired length of stretch has been accomplished.

The current employment and method of use of state of the art tattle tales depends on the expertise of the machine operator and a second person viewing the tattle tale to communicate at the proper time so that the delay between the signaled termination time and the machine operator's reaction time to that signal and machine termination occurs at the proper time. Over stretching will occur at times regardless of the conscientiousness of the people performing the stretch forming operation.

There has not been a simple and accurate means to perform exact and repeatable stretch forming of material until the emergence of the present invention.

SUMMARY OF THE INVENTION

The present invention is directed to an improved tattle tale which eliminates the inaccuracy and non repeatability of the stretch forming of materials which often result in waste due to over and under stretching. In the present invention, a reference point is established between the tattle tale rectangular or base member and the elongated strip movable relative thereto. As relative movement occurs during stretch forming, electrical contact is made between a contact on the elongated member and each of a series of discrete contacts positioned on the base member in the direction of relative movement of the elongated member. These electrical contacts provide a signal to a counter which provides a visual indication of the number of contacts that were last made and accordingly the amount of stretch that has been applied to the material. In this manner, the stretch machine operator has a real time indication of when to continue or terminate the stretch operation. Accordingly, accurate stretch forming can be performed, as well as, repeatability of the required degree of stretch to similar parts or material without the aid of a second person.

It is an object of this invention to provide a means to insure accurate stretch forming of materials.

It is another object of this invention to provide a means of indicating the amount of stretch that has occurred to a piece of material being stretched that is similar in appearance and operation to the present state of the art indicators so that operators of stretch forming machines will be sufficiently familiar with the use of the present invention with a minimum of training and familiarization.

Another object of the invention is to provide a device of the character herewithin described which is simple in construction, economical in manufacture and otherwise well suited to the purpose for which it is designed.

Yet another object is to eliminate the need for a second person during a stretch forming operation.

With the foregoing objects in view, and other such objects and advantages as will become apparent to those skilled in the art to which this invention relates as the specification proceeds, the invention consists essentially in the arrangement and construction of parts all as hereinafter more particularly described, reference being had to the accompanying drawings in which:

BRIEF DESCRIPTION OF THE DRAWING FIGURES

DETAILED DESCRIPTION OF THE PREFERRED EMBODIMENT

Figure 1:
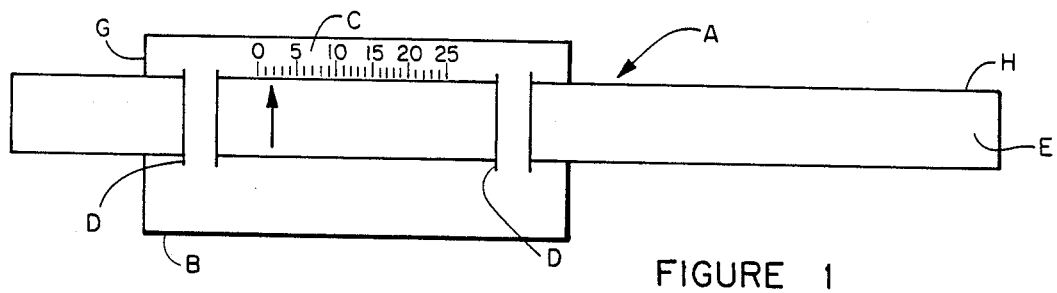
FIG. 1 is a plan view showing of a state of the art tattle tale.
Figure 2:
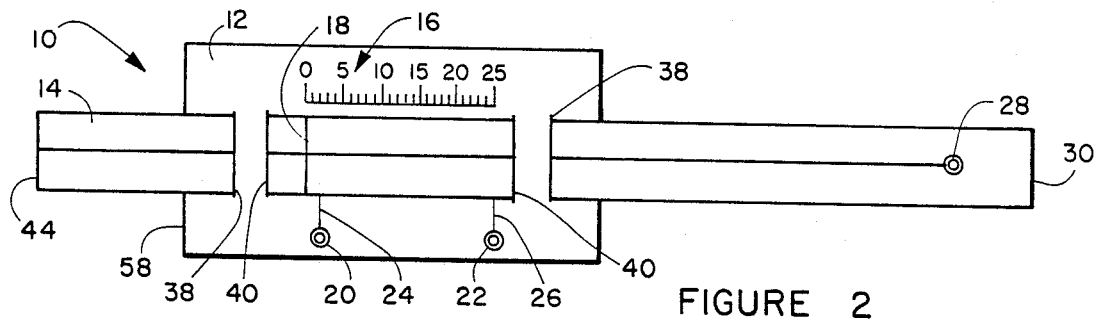
FIG. 2 is a plan view showing of the tattle tale of the present invention.

Referring to the various drawing figures, FIG. 2 is a plan view depicting the tattle tale 10 of the present invention. A rectangular body member or base portion 12 and an elongated strip 14 similar in appearance to the ones described above, as representative of the current state of the art, is shown. Graduations 16 are shown on the rectangular portion and a reference vertical line 10 is shown on the elongated member 14. A pair of spaced apart electrical connectors 20 and 22 and their respective plated leads 24 and 26 are shown. Their purpose will be hereinafter described in detail. An electrical connector 28 is shown located near end 30 of the elongated strip 14.

Figures 3, 4B:
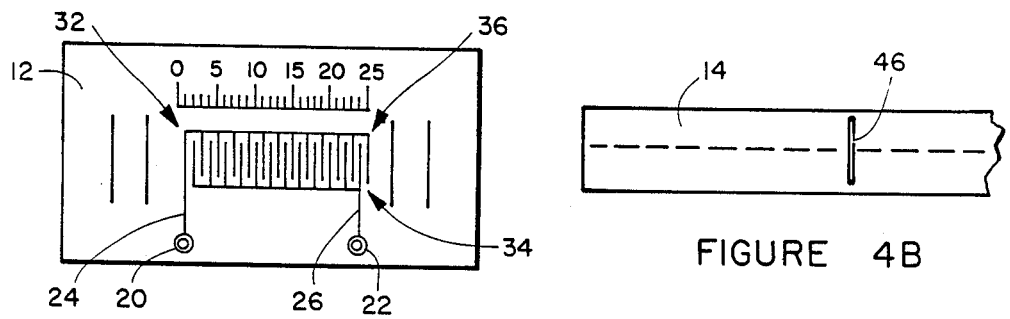
FIG. 3 is a plan view showing of the base portion of the tattle tale of the present invention.
FIGS. 4a and 4b are plan views showing elongated strips which interact with the base portion of FIG. 3 to monitor the degree of material stretch.

FIG. 3 is a showing of the base portion 12 of the tattle tale 10 with th.e elongated strip 14 removed. Both connectors 20 and 22 are shown with inter related grids 32 and 34 respectively of plated pads 36 on the surface thereof. The vertical extending pads 36 are connected to their respective connectors 20 and 22 at one end with the other end free from connection. The pads attached to the connector 20 alternate with the vertical extending pads attached to the connector 22. There is no electrical connection between the electrical connectors 20 and 22. As shown, the outer most pad extending to the connector 20 is vertically in line with the first indication of the graduations 16 to the right of the reference graduation and the last pad on the right side of the figure vertically aligns with the last graduation. As shown above, the vertical slits 38 and 40 receive the elongated member 14 and allow left and right relative movement of the members 12 and 14.

Figure 4A:
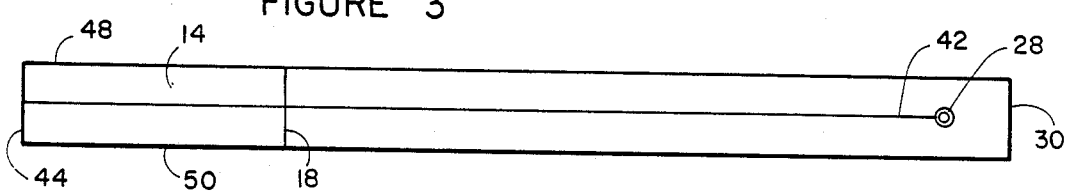

Referring now specifically to FIG. 4, this figure depicts the opposite side of the elongated member 14 from the FIG. 2 showing. An elongated pad 42 extends from end 44 of the elongated member 14. Opposite the vertical indicator 18 is a vertical pad 46 extending from edges 48 and 50 of the elongated member in a direction transverse to long dimension of the elongated pad.

Figure 5:
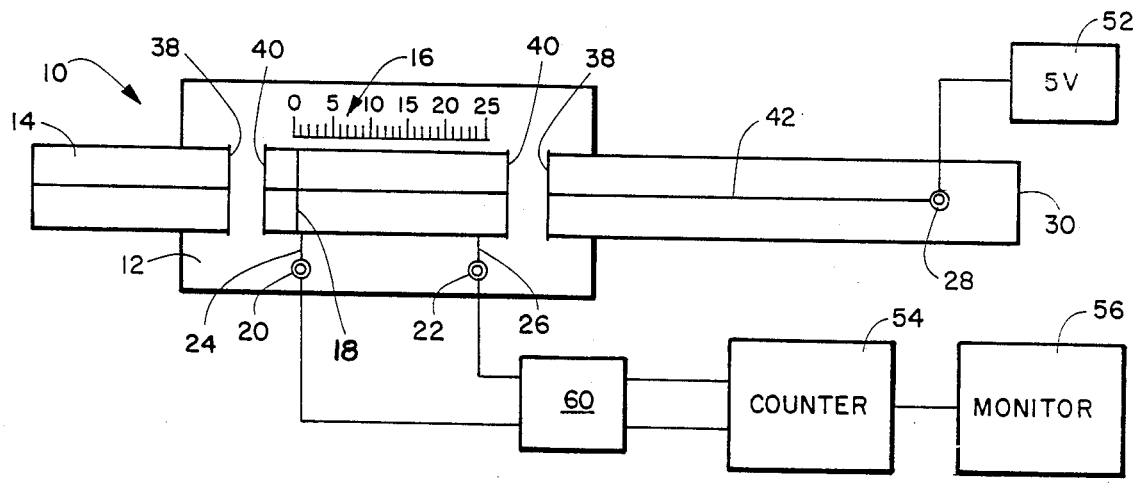
FIG. 5 is a schematic showing of an electronic hook up of the tattle tale of the present invention for stretch machine operator monitoring during material stretch.

Referring now to FIG. 5, the tattle tale 10 of the present invention is shown with the elongated member connection 28 connected to a 5 volt DC power source 52 and each of the other connectors 20 and 22 connected to the input of a dual counter 54 which include a separate visual indicator 56 or includes a built in indicator shown.

In operation the pad 46 of the elongated member is aligned with the first graduation or reference indicated on FIG. 3 as "0" after the base member is attached adjacent to its end 58 to the material to be stretched and before the elongated member 14 is attached to that material to be stretched at its end 30. The end 30 is then attached to the material to be stretched. As the material is stretched, there is relative movement between the base member 12 and elongated member 14, as herein before discussed in relation to the prior art. In addition to the physical relative movement and movement of the vertical indicator relative to the graduations, as each vertical pad on the base member contacts the vertical pad on the elongated member during relative movement, a 5 volt DC pulse is received by the counter 54 which registers a count on the visual indicator. The operator watches the indicator until the required number of counts are present for the length of material stretch desired and then the stretch action is terminated. In this manner accurate material stretching and stretch repeatability between similar material can be accomplished.

In order not to receive a count when stretching is complete from rebound of the material due to the elasticity of the material being stretched moving of the vertical indicator to the left, an anti ambiguity circuit 60 many of which are well known in the art, can be inserted in series between the connectors and the counter whereby a single return count will be ignored by the counter.

The base and elongated member can be constructed of any material suitable for performing the functions of the invention as described. The pads can be of any suitable thickness of conductive material to provide a sliding electrical connection during relative movement. The construction of conduction pads of the type described are well known in the electronic circuit board art. It has been found that, by way of example, and not by way of limitation, approximately 0.020 of an inch pad thickness is suitable to practice the invention.

Since various modifications can be made in the invention as hereinbefore described, and many apparently widely different embodiments of same made within the spirit and scope, it is intended that all matter contained in the accompanying specification shall be interpreted as illustrative only and not in a limiting sense.

What is claimed is:

1. A tattle tale for attachment to a piece of material to be intentionally stretched to indicate the change of length of that piece of material during intentional stretching comprising:
   a body portion;
   an elongated portion slideably carried by said body portion for relative movement therebetween;
   a plurality of juxtaposed first raised electrical conductive pads located on said body portion and positioned transverse to the direction of relative movement of said portions;
   a single raised second electrical conductive pad carried by said elongated portion positioned so as to electrically contact successive first raised pads during relative movement of said portions; and
   a source of electrical energy connected to said second raised pad;
   said plurality of first raised pads connected in at least one series string;
   said at least one series string connected to the input of a means for detecting electrical contact between said second raised pad and one of said plurality of first raised pads and producing a visual indication thereof which is directly related to the length of relative movement between said portions and the length that said material has been intentionally stretched.

2. The invention as defined in claim 1 further comprising at least one reference indicator on said body portion adjacent to said elongated member and at least one reference indicator on said elongated member for vertical alignment with said reference indicator prior to intentionally stretching said material.

3. The invention as defined in claim 1 wherein said plurality of juxtaposed first electrical conductive pads are spaced apart a substantially equal distance.

4. The invention as defined in claim 1 wherein said plurality of juxtaposed first raised electrical conductive pads form two separate series strings with a raised pad of each of said strings alternately positioned along the direction of relative movement of said portions.

5. The invention as defined in claim 1 wherein said means for detecting electrical contact and producing a visual indication thereof further comprises discrete means for indicating only successive contacts alternating between pads of each of said two separate series strings.

* * * * *